Figure 1:
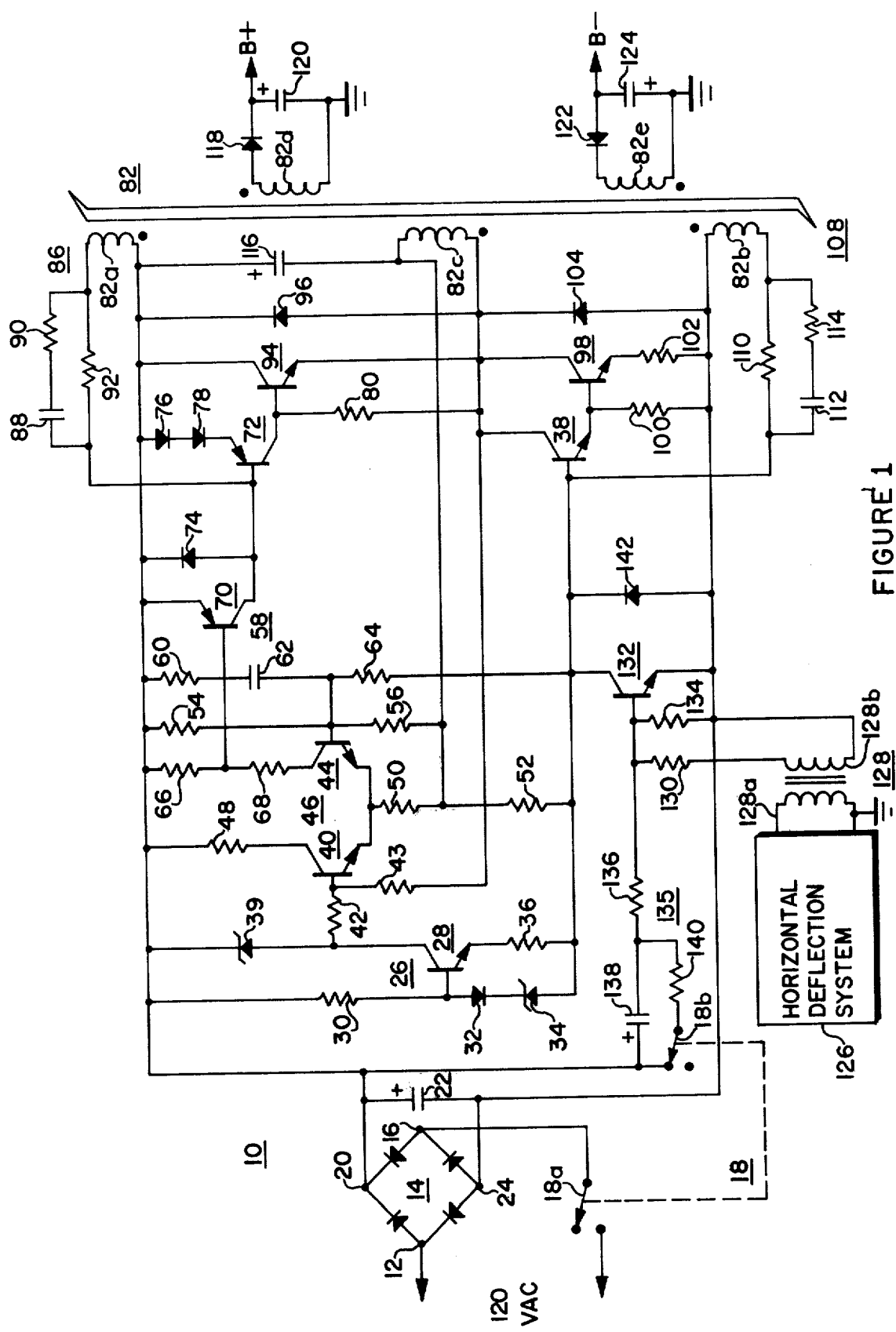

United States Patent
Scott

[11] 3,967,182
[45] June 29, 1976

[54] REGULATED SWITCHED MODE MULTIPLE OUTPUT POWER SUPPLY

[75] Inventor: Howard Mulder Scott, Moorestown, N.J.

[73] Assignee: RCA Corporation, New York, N.Y.

[22] Filed: June 20, 1975

[21] Appl. No.: 588,912

[52] U.S. Cl. .............................. 321/18; 321/45 R; 331/113 A
[51] Int. Cl.² ........................................ H02M 3/335
[58] Field of Search ....................... 321/2, 18, 45 R; 331/113 A

[56] References Cited
UNITED STATES PATENTS

| | | | |
|---|---|---|---|
| 3,243,727 | 3/1966 | Miller | 331/113 A |
| 3,443,195 | 5/1969 | Hoffman et al. | 321/2 |
| 3,582,754 | 6/1971 | Hoffmann et al. | 321/18 X |
| 3,702,963 | 11/1972 | Donovan | 321/45 R |

*Primary Examiner*—A. D. Pellinen
*Attorney, Agent, or Firm*—Eugene M. Whitacre; Paul J. Rasmussen

[57] ABSTRACT

A regulated switched mode power supply comprising a first rectifier adapted to be coupled to a first source of alternating current potential to produce a first source of direct current potential, an oscillator coupled to the first source of direct current potential to produce a second source of alternating current and a second rectifier coupled to the oscillator to produce a second source of direct current potential. The second source of direct current potential being maintained relatively constant with a predetermined range of variations of magnitude of the first alternating current potential by controlling a first pulse width of the second alternating current potential in response to a correction signal. The correction signal is derived by comparing a reference potential and a third direct current potential which is developed across a storage capacitor, the third direct current potential being a function of the first pulse width and the magnitude of the first alternating current potential.

9 Claims, 10 Drawing Figures

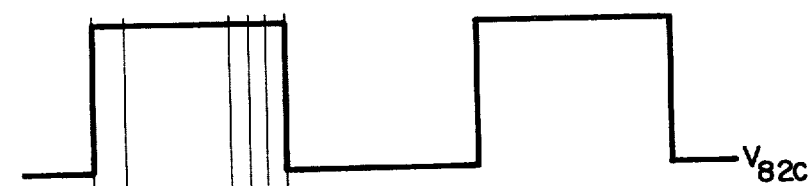
FIG. 2A
FIG. 2B
FIG. 3
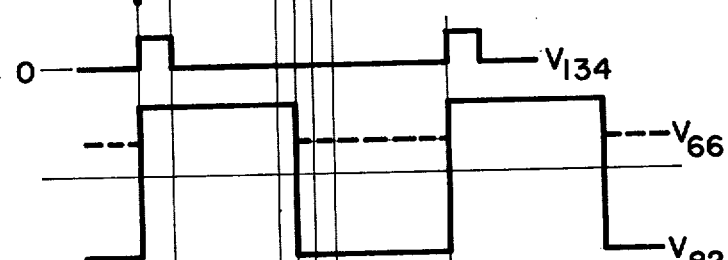
FIG. 4A
FIG. 4B
FIG. 5A
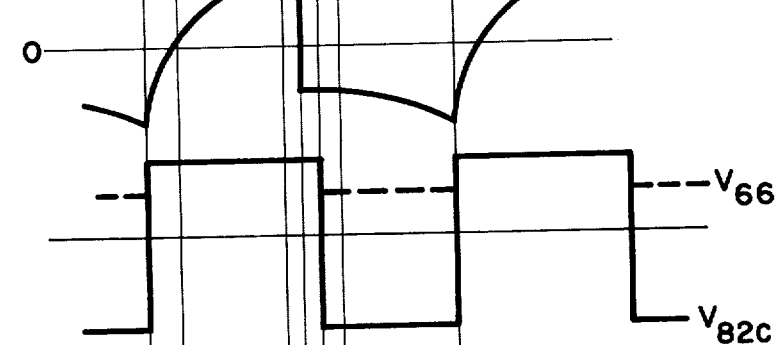
FIG. 5B
FIG. 6A
FIG. 6B
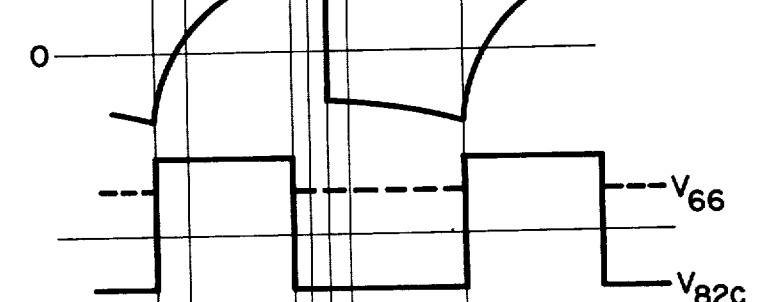

REGULATED SWITCHED MODE MULTIPLE OUTPUT POWER SUPPLY

BACKGROUND OF THE INVENTION

This invention relates to a regulated power supply for a television receiver.

Television receivers, which obtain operating power from an alternating current source producing any one of a plurality of RMS potentials within a predetermined range, have, traditionally, been provided with various regulation circuits in order to maintain relatively uniform performance of the television receiver within the predetermined range of RMS potentials.

Many different types of regulation circuits have been used. One type controls various critical direct current potentials while not controlling some less critical direct current potentials in the television receiver. Another type provides for compensation in each of the individual circuits of the television receiver for variations in direct current potentials. A third type controls the entire source of direct current potentials for the television receiver.

One regulator circuit for controlling the entire source of direct current potentials rectifies the first alternating current potential to produce a first direct current potential, chops the first direct current potential by means of an oscillator to produce a second alternating current potential, transforms the second alternating current potential to one or more levels and rectifies the transformed alternating current potentials to produce the desired direct current operating potentials. The regulation is accomplished by sampling one of the operating potentials and controlling the duty cycle of the oscillator to maintain the sampled operating potential at a relatively stable level. This circuit, while providing an efficient means of regulating, does not provide for good regulation of more than the direct current operating potential being sampled when the load on non-sampled operating potentials is changed.

Another regulation circuit for controlling the entire source of direct current potentials rectifies the first alternating current potential to produce a first direct current potential and regulates the first direct current potential by a comparison to a reference source. To provide a number of direct current operating potential levels with high efficiency, the first direct current potential is chopped by means of an oscillator, transformed and rectified. This type of circuit provides good regulation of all operating direct current potentials within the range of RMS potentials as well as isolation between the source of alternating current and the television receiver chassis. However, this circuit is less efficient than the previously described circuit because of the power loss in the regulation of the first direct current potentials.

It would be desirable to accomplish the regulation afforded by the latter circuit with more efficiency and fewer components.

SUMMARY OF THE INVENTION

A regulated power supply comprises first and second terminals adapted to be coupled to a first source of direct current potential. Oscillator means coupled to the first and second terminals develops a first alternating current potential having a first polarity pulse width which is responsive to a correction signal and a second polarity pulse width. Charge storage means coupled to the first terminal stores a second direct current potential the magnitude of which, relative to the first terminal, is a function of the second polarity pulse width and said first direct current potential. Potential reference means coupled to the first and second terminals develops a third direct current potential which is of a fixed magnitude and polarity with respect to the first terminal. Potential comparator means coupled to the potential reference means and the charge storage means develops a correction signal when the second direct current potential is different from the third direct current potential, thereby altering the first polarity pulse width.

A more detailed description of a preferred embodiment of the invention is given in the following detailed description and accompanying drawings of which:

FIG. 1 is a schematic diagram, partially in block form, of a regulated power supply embodying the invention; and FIGS. 2A&B, 3, 4A&B, 5A&B and 6A&B are normalized waveforms obtained at various points in the schematic diagram of FIG. 1 and under various conditions.

DESCRIPTION OF THE INVENTION

FIG. 1 is a schematic diagram, partially in block form, of a regulated power supply 10 embodying the invention. A source of alternating current voltage (not shown) is coupled to a terminal 12 of a bridge rectifier 14 and selectively coupled to a terminal 16 of bridge rectifier 14 by a section 18a of an off-on switch 18. A terminal 20 is coupled to the positive terminal of a filter capacitor 22. A terminal 24 of bridge rectifier 14 is coupled to the negative terminal of the filter capacitor 22.

A current source 26 comprising a transistor 28, a resistor 30, a temperature stabilizing diode 32, a zener diode 34, and a resistor 36 is coupled between terminal 20 of bridge rectifier 14 and the base electrode of a transistor 38. The collector electrode of transistor 28 is coupled to the anode of a zener diode 39. The cathode of zener diode 39 is coupled to terminal 20 of bridge rectifier 14. The current source 26 operating in conjunction with zener diode 39 produces a stable reference voltage at the collector of transistor 28 relative to terminal 20 of bridge rectifier 14.

The collector electrode of transistor 28 is also coupled to the base electrode of a transistor 40 by means of a resistor 42. The base electrode of transistor 40 is also coupled to the collector electrode of transistor 38 by means of a resistor 43, thereby providing for alteration of the voltage at the base of transistor 40 in response to the conduction of transistor 38. The transistor 40 operates in conjunction with a transistor 44 to form a voltage comparator 46. The collector electrode of transistor 40 is coupled to terminal 20 by means of a resistor 48. The emitter electrodes of transistors 40 and 44 are coupled to the base electrode of transistor 38 by means of a series combination of a resistor 50 and a resistor 52. The junction of resistors 50 and 52 is coupled to terminal 20 by means of a series combination of resistors 54 and 56. The junction of resistors 54 and 56 is coupled to the base electrode of transistor 44. The base electrode of transistor 44 is coupled to the terminal 20 by means of a transient suppression network 58 comprising a series combination of a resistor 60 and a capacitor 62. The base electrode of transistor 44 is also coupled to the base electrode of transistor 38 by means of a resistor 64. The collector electrode of transistor 44 is coupled to terminal 20 by means of a series combination of a resistor 66 and a resistor 68. The junction of resistors 66 and 68 is coupled to the base electrode of a switching transistor 70. The emitter electrode of transistor 70 is coupled to terminal 20 and the collector electrode is coupled to the base electrode of a transistor 72. A protection diode 74 is coupled in parallel with the emitter-collector junction of transistor 70.

The emitter electrode of transistor 72 is coupled to terminal 20 by means of a series combination of diodes 76 and 78 which reduce the threshold sensitivity of the transistor 72. The collector electrode of transistor 72 is coupled to the collector electrode of transistor 38 by means of a resistor 80. The collector electrode of transistor 72 is also coupled to the base electrode of transistor 94. The collector electrode of transistor 94 is coupled to terminal 20 and the emitter electrode of transistor 94 is coupled to the collector electrode of transistor 38. A commutating diode 96 is coupled in parallel with the collector-emitter junction of transistor 94.

A feedback winding 82a of a transformer 82 is coupled to the base electrode of transistor 72 by means of a feedback network 86 which comprises a capacitor 88, a resistor 90, and a resistor 92. The other terminal of feedback winding 82a is coupled to terminal 20.

The emitter electrode of transistor 38 is coupled to the terminal 24 of bridge rectifier 14 by means of a resistor 100 and also coupled to the base electrode of a transistor 98. The collector electrode of transistor 98 is coupled to the collector electrode of transistor 38 and the emitter electrode is coupled to terminal 24 by means of a resistor 102. A commutating diode 104 is coupled in parallel with the collector-emitter junction of transistor 98.

A feedback winding 82b of transformer 82 is coupled to the base electrode of transistor 38 by means of feedback network 108 comprising a resistor 110, a capacitor 112, and a resistor 114. THe other terminal of feedback winding 82b is coupled to terminal 24 of bridge rectifier 14.

Winding 82c in series combination with a capacitor 116 is coupled between the collector electrode of transistor 98 and terminal 20 of bridge rectifier 14. The junction of capacitor 116 and winding 82c is coupled to the junction of resistors 50 and 52.

A winding 82d of transformer 82 is coupled by means of a diode 118 to a filter capacitor 120. The junction of the winding 82d and the capacitor 120 is coupled to reference potential thereby providing a source of positive direct current potential at the junction of diode 118 and capacitor 120 with respect to reference potential in response to alternating current potentials developed on winding 82d. A winding 82e is coupled by means of a diode 112 to a capacitor 124. The junction of winding 82e and capacitor 124 is coupled to reference potential thereby providing a source of negative direct current potential at the junction of diode 122 and capacitor 124 with respect to reference potential in response to alternating current potentials developed on winding 82e.

The relative polarization of the windings 82a–e is indicated by polarization dots adjacent the respective windings.

A horizontal deflection system 126 is coupled to a primary winding 128a of an isolation transformer 128. A series combination of a secondary winding 128b of isolation transformer 128 and a resistor 130 is coupled between the terminal 24 of bridge rectifier 14 and the base electrode of a synchronizing switching transistor 132. The base electrode of transistor 132 is coupled to terminal 24 by means of a resistor 134. The base electrode of transistor 132 is also coupled to terminal 20 of bridge rectifier 14 by means of a start-up circuit 135 comprising a resistor 136, a capacitor 138, a resistor 140 and a section 18b of off-on switch 18. A protection diode 142 is coupled in parallel with the collector-emitter junction of transistor 132.

The waveforms shown in FIGS. 2A&B, FIG. 3, FIGS. 4A&B, FIGS. 5A&B, and FIGS. 6A&B will be utilized in the explanation of the operation of the regulated switched mode multiple output power supply 10.

The operation will first be considered without synchronizing pulses and without operation of the voltage comparator 46 (i.e., transistor 70 remains in cut-off). An alternating current voltage is applied to terminals 12 and 16 of the bridge rectifier 14 when section 18a of off-on switch 18 makes contact. The alternating current voltage between terminals 12 and 16 of bridge rectifier 14 produces a direct current potential across filter capacitor 22 which is positive at terminal 20 with respect to terminal 24.

Operation of off-on switch 18 which closes section 18a opens section 18b. With section 18b open, capacitor 138 starts to charge to the potential across filter capacitor 22 thus producing a current through resistor 136 and the base-emitter junction of transistor 132. The current flow through the base-emitter junction of transistor 132 causes saturation of the transistor 132 which holds the voltage at the base of the transistor 38 below a level which would provide for any significant conduction through the collector emitter junctions of transistors 38 and 98. During the time interval when transistor 132 is in saturation, capacitor 116 charges through resistor 52 and transistor 132 toward the voltage across filter capacitor 22.

When capacitor 138 approaches full charge, the current through the base-emitter junction of transistor 132 reduces until transistor 132 cuts off. With transistor 132 cut off, the voltage on the base of the transistor 38 established by current flow from terminal 20 of the bridge rectifier 14 through the constant current source 26 and the voltage comparator 46 and thorugh the feedback network 108 provides for conduction of transistors 38 and 98. With transistors 38 and 98 in conduction, current flows from terminal 20 of bridge rectifier 14 through capacitor 116, winding 82c of transformer 82, and transistors 38 and 98 to terminal 24 of bridge rectifier 14. As the current increases through winding 82c, a voltage is developed across winding 82b resulting in a current flow through the feedback network 108 which increases the current in the base-emitter junction of transistor 38. The increase in the current flow through the base-emitter junction of transistor 38 further increases the collector-emitter conduction of transistor 98 thereby further increasing the current flow through the winding 82c, and so on.

In the absence of synchronizing pulses produced by the horizontal deflection system 126 which are coupled to the base-emitter junction of transistor 132 via isolation transformer 128 and resistor 132, the current through winding 82c of transformer 82 continues to increase until the transformer 82 saturates. With transformer 82 saturated, no voltage is developed across the winding 82b; therefore, the base-emitter current in transistor 38 decreases and the current through winding 82c and transistor 98 decreases. As the current through winding 82c decreases, the current flowing through constant current source 26 and voltage comparator 46 from terminal 20 of bridge rectifier 14 is diverted away from the base-emitter junction of transistor 38 by means of the voltage developed across the winding 82b thereby further decreasing the current flow in winding 82c.

As the current through the winding 82c decreases, a voltage is developed across the winding 82a which produces a current through the feedback network 86 and the base-emitter junction of transistor 72 producing saturation of transistors 72 and 94. With transistor 94 saturated, the current flow through the winding 82c decreases very rapidly to zero followed by a current flow of an opposite polarity (i.e., opposite to that produced by conduction of transistors 38 and 98) produced by a discharge of the capacitor 116 through winding 82c and transistor 94.

With transistor 70 cut off, when the current in the winding 82c stops changing, no voltage is produced by the winding 82a; therefore, transistor 72 is cut off which results in a cut-off of the transistor 94. The current through the winding 82c again begins to decrease producing a voltage across winding 82b which provides for the conduction of transistors 38 and 98.

The alternation of current flow through the winding 82c produced by the alternate conduction of transistors 38 and 98 and transistors 72 and 94 produce a voltage across winding 82c as shown in FIG. 2A and a current flow through the winding 82c as shown in FIG. 2B. The voltage across the winding 82c produces a voltage across the windings 82d and 82e which when rectified provides a source of B+ and a source of B−, respectively.

When synchronizing pulses are produced across the resistor 134 as shown in FIG. 3, the transistor 132 is placed in saturation at $T_0$ thereby cutting off the transistors 38 and 98 prior to cut-off which would occur in the absence of synchronizing pulses. The synchronization provided for in this manner reduces the interference which would be produced in, for example, the video signal of the television receiver (not shown) if the B+ and B− contain ripple signals of a different frequency from the horizontal deflection signals.

In order to provide for regulation of the B+ and B− produced by rectification of the voltage developed across windings 82d and 82e, respectively, with a range of levels of alternating current voltage applied to terminals 20 and 24 of bridge rectifier 14, the transistor 72 and 94 are cut off prior to the time when they would be cut off by saturation of transformer 82 when transistors 72 and 94 are conducting (i.e., between $T_2$ and $T_4$, FIGS. 4A–6B). This regulation is accomplished by comparing the voltage across the capacitor 116 to the reference voltage provided by the constant current source 26 in combination with the zener diode 39. The reference voltage developed by the zener diode 39 is coupled to the base electrode of transistor 40 by means of resistor 42, and the voltage across the capacitor 116 is coupled to the base of transistor 44 by means of the voltage divider comprising resistors 54 and 56. When the voltage on the base electrode of transistor 44 exceeds the voltage on the base electrode of transistor 40, current flows through the collector-emitter junction of transistor 44 and resistors 66 and 68. The voltage developed across the resistor 66 produces saturation of the transistor 70 producing cut-off of the transistors 72 and 94. Under nominal conditions of alternating current voltage applied to terminals 12 and 16 of bridge rectifier 14, the discharge of the capacitor 116 produces conduction of the transistor 44 at $T_3$ as shown in FIG. 4A. The voltage developed across the resistor 66 by the conduction of transistor 44 is shown by the dotted waveform in FIG. 4A. At $T_3$ it can be seen that the voltage across winding 82c makes a negative transition due to conduction of transistor 70 and the resultant cut-off of transistors 72 and 94.

With transistors 38 and 98 in conduction, the voltage applied to the base electrode of transistor 40 is reduced below the voltage at the collector electrode of transistor 28 by the divider action of resistors 42 and 43. This divider action provided for by resistors 42 and 43 during the conduction of transistors 38 and 98 produces a hysteresis in the voltage comparator 46 thereby stabilizing the operation of the regulation.

Under conditions of high level alternating current voltage applied to terminals 12 and 16 of bridge rectifier 14, the capacitor 116 is charged to a slightly higher potential than under nominal alternating current conditions during the conduction of transistors 38 and 98; therefore, the transistor 44 of the voltage comparator 46 does not go into conduction until $T_4$ as shown in FIG. 5A. This delay in the conduction of transistor 44 increases the positive pulse width of the voltage developed across the winding 82c thereby maintaining the same positive peak voltage across windings 82d and 82e under high level alternating current voltages as that produced across windings 82d and 82e under nominal alternating current voltages.

Under conditions of low limit alternating current voltages applied to terminals 12 and 16 of bridge rectifier 14, capacitor 116 is charged to a slightly lower voltage than under high level alternating current voltage conditions or nominal alternating current voltage conditions during conduction of transistors 38 and 98 and, therefore, transistor 44 goes into conduction at $T_2$ as shown in FIG. 6A, thereby reducing the positive pulse width of the voltage developed across winding 82c. The reduction in the positive pulse width of the voltage developed across winding 82c maintains the same positive peak voltage developed across windings 82d and 82e under low limit alternating current voltages as produced across windings 82d and 82e under nominal alternating current voltages.

The current flow through winding 82c under nominal, high and low alternating current voltages are as shown in FIGS. 4B, 5B and 6B, respectively.

With the same positive peak voltage developed across winding 82c with a range of alternating current voltages applied to terminals 12 and 16 of bridge rectifier 14, the positive peak voltage developed across windings 82d and 82e will be the same; therefore, the B+ and B− operating potentials produced from windings 82d and 82e will be the same. It can be observed that the B− operating potential must be derived by an inversion of the polarity of winding 82e with respect to ground as compared to winding 82d with respect to ground.

What is claimed is:
1. A regulated power supply comprising:
first and second terminals adapted to be coupled to a first source of direct current potential;
oscillator means coupled to said first and second terminals for developing a first alternating current potential having a first polarity pulse width which is responsive to a correction signal and a second polarity pulse width;

charge storage means coupled to said first terminal for storing a second direct current potential the magnitude of which, relative to said first terminal, is a function of said second polarity pulse width and said first direct current potential;

potential reference means coupled to said first and second terminals for developing a third direct current potential which is of a fixed magnitude and polarity with respect to said first terminal; and potential comparator means coupled to said potential reference means and said charge storage means for developing a correction signal when said second direct current potential is different from third direct current potential, thereby altering said first polarity pulse width.

2. A regulated power supply according to claim 1 wherein said oscillator means includes a transformer having a first winding which is coupled to said first source of direct current potential for producing flux in said first winding proportional to said first and second polarity pulses, said transformer being the dominant factor in determining a minimum frequency of said first alternating current potential.

3. A regulated power supply according to claim 2 further including start means coupled to said oscillator means and said charge storage means for establishing a predetermined initial charge on said charge storage means prior to the initiation of production of said first alternating current potential and insuring a start of the production of said first alternating current potential by said oscillator means after the application of said first direct current potential to said first and second terminals.

4. A regulated power supply according to claim 3 wherein said start means includes time delay means for delaying the start of the production of said first alternating current potential for a predetermined period after the application of said first direct current potential.

5. A regulated power supply according to claim 4 wherein said oscillator means is further adapted to be coupled to a source of synchronizing signals producing pulses at a frequency greater than said minimum frequency thereby providing for control of the frequency of said first alternating current potential in response to said synchronizing signals.

6. A regulated power supply according to claim 5 further including a first rectifying means coupled to a second winding of said transformer in a manner which provides for the production of a first regulated direct current potential.

7. A regulated power supply according to claim 6 further including a second rectifying means coupled to a third winding of said transformer in a manner which provides for the production of a second regulated direct current potential.

8. A regulated power supply according to claim 7 further including a third rectifying means adapted to be coupled to a second source of alternating current potential for producing said first direct current potential.

9. A regulated power supply according to claim 8 wherein said charge storage means includes a capacitor.

* * * * *